Feb. 21, 1950 L. F. CURTIS ET AL 2,498,253

FREQUENCY-MODULATION DETECTOR SYSTEM

Filed May 16, 1946 2 Sheets-Sheet 1

INVENTOR:
LESLIE F. CURTIS,
BERNARD D. LOUGHLIN,

BY Harry C. Page

ATTORNEY.

Feb. 21, 1950 L. F. CURTIS ET AL 2,498,253

FREQUENCY-MODULATION DETECTOR SYSTEM

Filed May 16, 1946 2 Sheets-Sheet 2

INVENTOR:
LESLIE F. CURTIS,
BERNARD D. LOUGHLIN,
BY Harry C. Page
ATTORNEY.

Patented Feb. 21, 1950

2,498,253

UNITED STATES PATENT OFFICE 2,498,253

FREQUENCY-MODULATION DETECTOR SYSTEM

Leslie F. Curtis, Great Neck, and Bernard D. Loughlin, Bayside, N. Y., assignors to Hazeltine Research, Inc., Chicago, Ill., a corporation of Illinois Application May 16, 1946, Serial No. 670,070

19 Claims. (Cl. 250—27)

Figure 1:
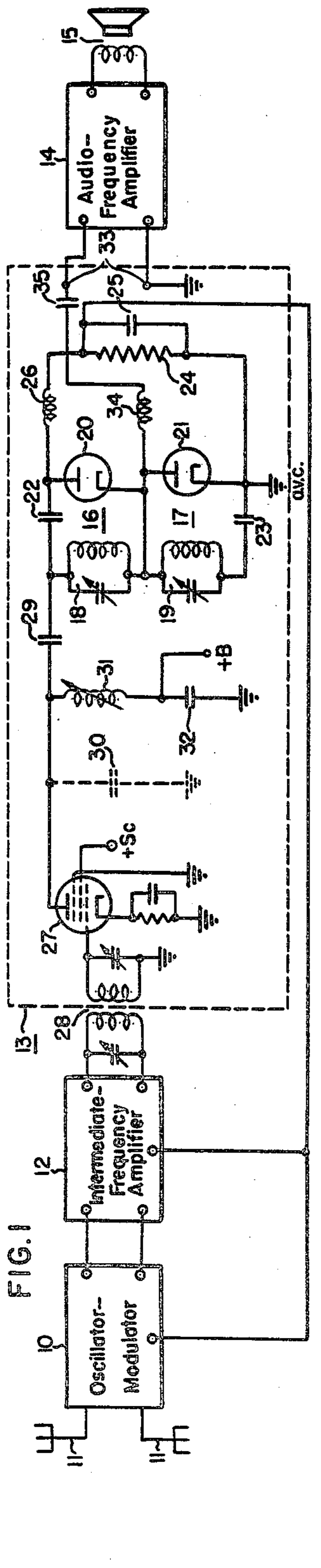

The present invention relates to frequency-modulation detector systems and, particularly, to such systems which have substantially reduced response to amplitude modulation.

Frequency-modulation receivers include a frequency-modulation detector for deriving the modulation components of a received frequency-modulated wave signal. The conventional frequency-modulation detector has a frequency-selective network, which changes the frequency modulation of the received wave signal to amplitude modulation, followed by a rectifier system which is responsive to the amplitude modulation to derive the modulation components of the wave signal. Since this detector is inherently amplitude responsive, it is in general responsive to undesired spurious amplitude variations of the received wave signal such as those due to atmospheric conditions or electrical disturbances. Even if this frequency detector is of a balanced type, its output is proportional to the degree of frequency modulation and to the instantaneous amplitude of the received wave signal, including any undesired variations thereof. A conventional frequency detector is therefore frequently preceded by a limiting system which largely removes the undesired amplitude variations of the received wave signal prior to the application of the latter to the detector.

The use of a separate limiting system with a frequency detector has numerous disadvantages, among which may be mentioned the increased cost and complexity of the receiver, the fact that additional vacuum tubes are required with attendant increased maintenance troubles and cost, and the increased power required to operate the receiver. Both the prior limiting systems and frequency detectors usually have additional limitations individual to each relating largely to their design and adjustment to effect the optimum operation desired thereof.

In order to avoid the disadvantages attendant upon the use of separate limiting systems and frequency detectors, it has been proposed that the frequency detector be so constructed and operated as to have somewhat reduced response to undesired amplitude variations of a received wave signal. One such frequency detector recently proposed (and now described in Tele-Tech, July 1947, pages 46–49, published by Caldwell-Clements, Inc., New York) has a frequency-response network comprising a tuned primary circuit with one terminal grounded, across which a modulated wave signal is applied, tightly coupled to a mid-tapped tuned secondary circuit. The midtap of the latter is effectively connected at wave-signal frequencies to the ungrounded terminal of the primary circuit, thereby to provide wave-signal voltages which when measured from secondary circuit terminals to ground are equal respectively to the instantaneous sum and difference of the primary voltage and one-half of the secondary voltage. Due to the phase relationships of the latter voltages, the magnitude of these sum-and-difference output voltages varies in opposite sense with frequency thus to change the frequency modulation of the applied wave signal to amplitude modulation between each secondary terminal and ground. These output voltages having the amplitude modulation mentioned are applied to individual rectifiers which are connected in series and poled to deliver rectified current in the same direction to a common load impedance. This load impedance has a relatively long time constant and provides across the two rectifiers in series a relatively constant bias voltage which is independent of the derived modulation signal but which varies only with the mean intensity of the received wave signal. This bias voltage causes the sum of the modulation-signal components of the wave signal appearing across the two rectifiers to be constant for any given intensity of a received wave signal. Modulation-signal components derived from one rectifier are applied to an output circuit of the detector for utilization.

The detector arrangement last described, while it has reduced response to undesirable amplitude variations of a received wave signal, involves a rather complex mode of operation not readily apparent nor easily analyzed. In particular, since the primary and secondary circuits are tightly coupled, the voltages applied to one rectifier are not independent of the load drawn by the other rectifier. Any attempt to attain desired performance characteristics for the detector involves no little initial experimentation by which to select, by the method of trial and error, suitable values for the circuit components of the detector. It is thus difficult to select in a given application the proper values of the circuit components for linear frequency detection and freedom from undesired amplitude response.

It is an object of the present invention, therefore, to provide a new and improved frequency-modulation detector system which avoids one or more of the disadvantages and limitations of prior frequency-modulation detectors.

It is a further object of the invention to provide a new and improved frequency-modulation detector system which possesses over a wide frequency range an excellent linearity characteristic with comparatively high sensitivity, and one which has substantially reduced response to undesirable amplitude variations of a frequency-modulated wave signal applied thereto.

It is an additional object of the invention to provide a frequency-modulation detector system of simplified and improved construction which is characterized by ease and flexibility of adaptation to numerous diverse applications involving widely different operating frequencies, and one which may be readily designed to provide desired operating characteristics.

In accordance with a particular form of the invention, a frequency-modulation detector system comprises a pair of resonant circuits in series with one another and a pair of rectifiers in series with one another and being individually coupled across individual ones of the resonant circuits to form a pair of rectifier networks. At least one of the rectifier networks has an amplitude-translation characteristic varying with frequency over a predetermined frequency range. The networks are individually conductive for wave-signal currents but individually substantially nonconductive for currents of modulation-signal frequencies. The detector system also includes means included with the rectifiers of the networks in a series unidirectional-current conductive circuit in which the rectifiers have like polarity and are adapted to provide in the last-mentioned circuit a bias potential which may change with wave-signal intensity but which has a substantially constant value over any period corresponding to a cycle of the lowest frequency undesired amplitude-modulation component. The system also includes means for applying a frequency-modulated wave signal to both of the networks, while maintaining equal effective values of wave-signal current flow to each thereof, and a modulation-signal output circuit effectively coupled across a portion the aforementioned series circuit including one of the rectifiers.

For a better understanding of the present invention, together with other and further objects thereof, reference is had to the following description taken in connection with the accompanying drawings, and its scope will be pointed out in the appended claims.

Figure 3B:
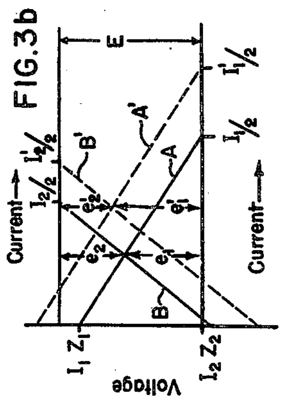
Figure 3A:
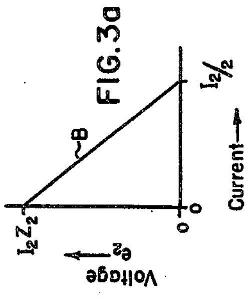
Figure 3:
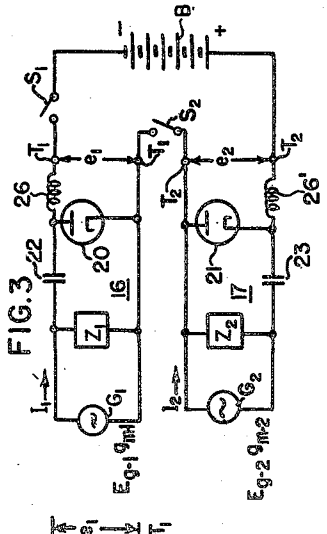
Figure 2A:
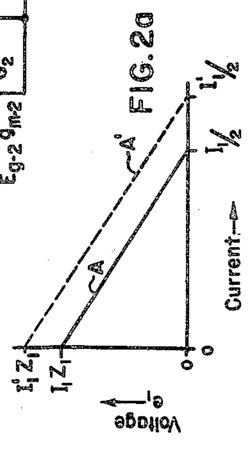
Figure 2:
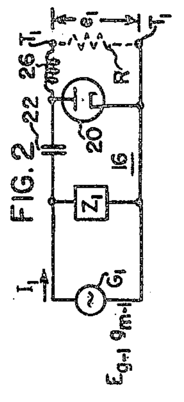
Figure 6:
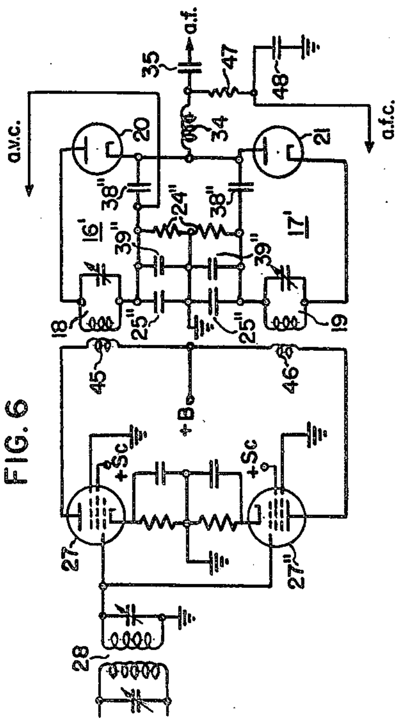
Figure 5:
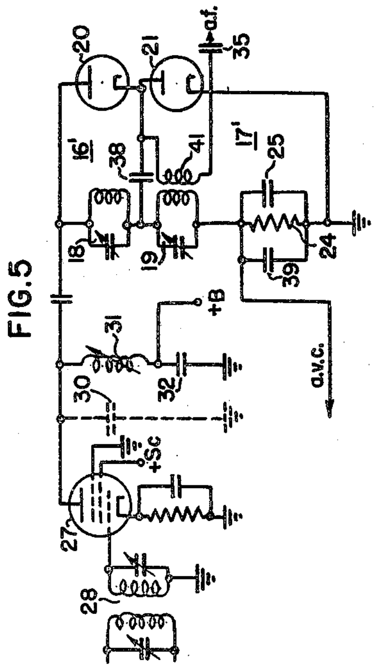
Figure 3D:
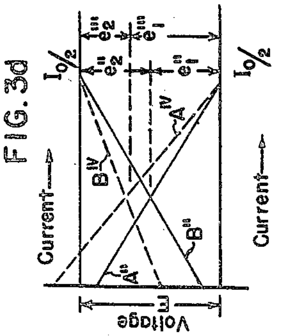
Figure 3C:
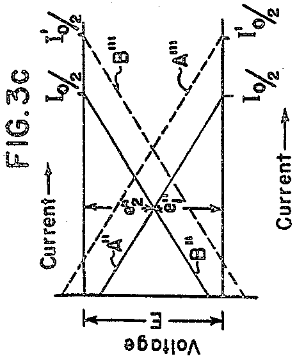
Figure 4:
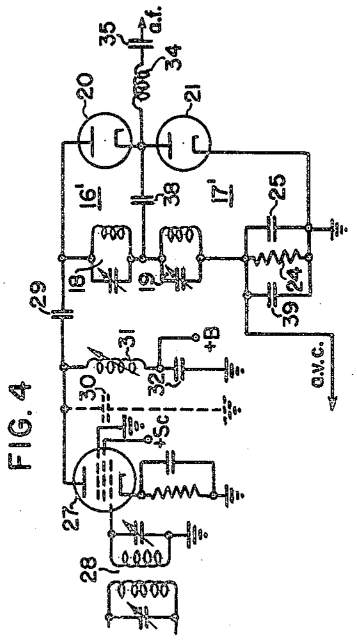

Referring now to the drawings, Fig. 1 is a circuit diagram, partly schematic, representing a complete frequency-modulation receiver embodying a frequency-modulation detector system of the present invention; Figs. 2 and 3 are circuit diagrams of simplified rectifier networks used as an aid in explaining the operation of the invention; Figs. 2*a* and 3*a* graphically represent assumed regulation characteristics for the rectifier networks of Figs. 2 and 3; Figs. 3*b* to 3*d*, inclusive, graphically represent certain operating characteristics of the Fig. 3 rectifier network; and Figs. 4, 5 and 6 are circuit diagrams representing modified forms of frequency-modulation detector systems embodying the present invention.

Referring more particularly to Fig. 1 of the drawings, there is represented, partly schematically, a complete frequency-modulation receiver embodying a particular form of frequency-modulation detector system of the present invention. This receiver includes an oscillator-modulator 10 having an input circuit coupled to an antenna system 11, 11 and having an output circuit coupled to an input circuit of an intermediate-frequency amplifier 12 of one or more stages. Coupled in cascade to the amplifier 12 is a frequency-modulation detector system 13, more fully described hereinafter, an audio-frequency amplifier 14, and a sound-reproducing device 15. An automatic amplification control or A. V. C. output circuit of the detector system 13 is coupled to the input circuits of one or more of the tubes of the oscillator-modulator 10 and the intermediate-frequency amplifier 12 in order to maintain the amplitude of the signal input to the detector system 13 within a relatively narrow range for a relatively wide range of received wave-signal intensities.

It will be understood that the various units just described may, with the exception of the frequency-modulation detector system 13, be of conventional construction and operation, the details of which are known in the art rendering further detailed description thereof unnecessary. Considering briefly the operation of the receiver as a whole, and neglecting for the moment the detailed operation of the frequency-modulation detector system 13, presently to be described, a desired frequency-modulated wave signal is selected by the oscillator-modulator 10, is converted by the latter unit to a frequency-modulated intermediate-frequency wave signal which is applied to and amplified by the intermediate-frequency amplifier 12, and is detected by the frequency-modulation detector system 13, thereby to derive the audio-frequency modulation components of the received wave signal. The audio-frequency components are, in turn, amplified in the audio-frequency amplifier 14 and are reproduced by the sound reproducer 15 in a conventional manner. The automatic amplification control or A. V. C. bias derived by the detector system 13 is effective to control the amplification of either or both of the units 10 and 12 to maintain the intensity of the signal input to the detector system 13 within a relatively narrow range for a wide range of received wave-signal intensities. While not shown, the A. V. C. bias may if desired be also applied in conventional manner to the amplifier stage of unit 13 additionally to control the amplification of this stage.

Referring now more particularly to the portion of the receiver embodying the present invention, the frequency-modulation detector system 13 includes a pair of rectifier networks 16 and 17 of which at least one has an amplitude-translation characteristic varying with frequency over a predetermined frequency range. In practice, this predetermined frequency range is the range of frequency deviation of the intermediate-frequency wave signal. As will be explained in greater detail hereinafter, the detector system is fully operative and is insensitive to undesired amplitude variations of the received wave signal when only one of the networks 16, 17 has the amplitude-translation characteristic mentioned. However, for maximum sensitivity of the detector system, it is preferable that the networks 16, 17 have individual amplitude-translation characteristics varying in opposite sense with frequency over the range mentioned. These networks include individual ones of a pair of uncoupled two-terminal resonant circuits 18, 19 tuned to individual spaced frequencies which are located symmetrically about the mean frequency of the frequency-modulated wave signal applied to the detector system, thus to provide the desired amplitude-translation characteristics. Each of the networks 16, 17 includes an individual diode rectifier 20, 21, respectively, and each has a circuit effectively closed through its rectifier and its resonant circuit by the provision of an individual coupling condenser 22, 23, respectively. The value of each of the condensers 22, 23 is sufficiently small that the closed circuits last mentioned are conductive for wave-signal currents but are substantially nonconductive for currents of modulation-signal frequencies.

The detector system is provided with means included with the rectifiers 20, 21 in a series unidirectional-current conductive circuit in which the rectifiers have like polarity and adapted to provide in the last-mentioned circuit a bias potential which may change with wave-signal intensity but which has a substantially constant value over any period corresponding to a cycle of the lowest frequency undesired amplitude-modulation component. This means comprises a rectifier load impedance, including a resistor 24 and shunt-connected condenser 25, having a time constant substantially longer than the period of the lowest frequency undesired amplitude-modulation component. In particular, the load impedance 24, 25 is common to both of the rectifiers 20, 21 and is coupled across the rectifiers through a radio-frequency choke coil 26 which isolates the load impedance from the wave-signal currents flowing in the rectifier networks 16, 17. The load-impedance time constant mentioned is preferably relatively long, for example, from approximately one-tenth to one second, and is provided in large part by the large value of capacitance of the condenser 25 which may have a capacitance of the order of 8 microfarads and may conveniently be of the electrolytic type.

The detector system additionally includes means for applying a frequency-modulated wave signal to both of the rectifier networks 16, 17 while maintaining equal effective values of wave-signal current flow to each thereof. This means comprises a wave-signal source and the series connection of the tuned circuits 18, 19 across the source. The wave-signal source may be of the current-regulated or constant-current type, for example, a pentode repeater vacuum tube 27 having input electrodes coupled through an intermediate-frequency band-pass selector 28 to the output circuit of the intermediate-frequency amplifier 12. The output electrodes of the vacuum tube 27 are coupled through a coupling condenser 29 to the serially connected tuned circuits 18, 19 of the respective rectifier networks 16, 17.

The output circuit of the vacuum tube 27 has inherent capacitance, shown as a broken-line condenser 30 to indicate that no physical condenser is normally involved, which tends undesirably to couple the rectifier networks 16, 17. The detector system includes means for reducing the effect on the networks 16, 17 of the inherent capacitance 30 to reduce the coupling of the networks thereby. This means comprises an adjustable inductor 31 coupled through a by-pass condenser 32 across the output circuit of the vacuum tube 27 and tuned by the capacitance 30 to resonance at a frequency in the intermediate-frequency range, preferably the mean frequency of the wave signal applied to the detector system. The use of this inductor has the additional advantage that it effects an increase of the output-circuit impedance of the vacuum tube 27 and thereby effects an increased amplification or gain of this amplifier stage. The anode of the vacuum tube 27 is energized through the inductor 31 from a source of anode potential, indicated as +B.

The detector system also includes a modulation-signal output circuit, comprising output-circuit terminals 33, 33, effectively coupled across a portion of the series circuit previously mentioned including one of the rectifiers 20, 21. In the detector system of Fig. 1, this output circuit is coupled across the rectifier 21 and includes a series coupling condenser 35 and a radio-frequency choke coil 34, for isolating the modulation-signal output circuit from the wave-signal currents flowing in the rectifier networks 16, 17.

The operation of the frequency-modulation detector system just described will now be considered with reference to Figs. 2, 2*a* and 3 to 3*d*, inclusive. Fig. 2 is a simplified equivalent-circuit diagram of the rectifier network 16 and the vacuum tube repeater 27. The repeater 27 is conventionally shown as a constant-current or current-regulated generator $G_1$ which generates a constant current having a peak value $I_1$ equal to $E_{g-1}g_{m-1}$ where $E_{g-1}$ is the peak value of the wave-signal voltage applied to the repeater 27 and $g_{m-1}$ is the mutual conductance of the latter. The impedance $Z_1$ of Fig. 2 represents the shunt impedance of the repeater 27 and the resonant circuit 18 in parallel and at the frequency, assumed constant, of the wave signal of voltage $E_{g-1}$. This equivalent circuit is shown as including output terminals $T_1$, $T_1$ across which a resistive load impedance R, shown in broken lines, may be connected to determine the regulation characteristic of the rectifier network. As is well known, the regulation characteristic of any such arrangement is ascertained by connecting different values of load impedance R across the output terminals $T_1$, $T_1$ and by then measuring for each value of load impedance the voltage $e_1$ developed across the load impedance and the rectified current which flows through the load impedance. Curve A of Fig. 2*a* graphically represents an assumed regulation characteristic for this rectifier system under the assumptions that the impedance $Z_1$ has negligible direct-current resistance, that the rectifier 20 has idealized 100% efficiency, and that the choke coil 26 completely isolates the load impedance R from currents of wave-signal frequency. When the load impedance has zero value, it will be evident that zero voltage is developed across the latter. At the same time, the idealized rectifier characteristic assumed is one in which the rectifier has negligible internal resistance so that its period of conduction is very short in relation to one-half cycle of the wave-signal current. Under these conditions, it is well known that the resulting short-circuit unidirectional current flowing in the load resistor R of given value has a value one-half that of the peak value $I_1$ of wave-signal current flowing from the generator $G_1$. Conversely when the load impedance R has infinitely large value, zero unidirectional current flows to the load impedance and the voltage $e_1$ developed thereacross has a value $I_1Z_1$. Intermediate values of load impedance R produce intermediate values of current flow and intermediate values of terminal voltage $e_1$, as represented by curve A of Fig. 2*a*. Now should the wave-signal current increase to a new value $I_1'$, as with increase of wave-signal voltage $E_{g-1}$ applied to the repeater 27, a new regulation curve results as indicated by broken-line curve A'.

Fig. 3 represents the equivalent circuit diagram of both of the rectifier systems 16 and 17 as arranged under the assumption that the repeater 27 comprises two current-regulated generators $G_1$ and $G_2$. A pair of switches $S_1$ and $S_2$ are shown as arranged upon closure to couple the rectifiers 20 and 21 in series through a battery B having a terminal voltage E.

An assumed regulation characteristic for the rectifier network 17, considered to have an input current of peak value $I_2$ supplied from a constant-current generator $G_2$, is represented graphically by curve B of Fig. 3*a*. This characteristic is ascertained, of course, with the switches $S_1$ and $S_2$ open and by the use of varying values of resistive load impedance across the output terminals $T_2$, $T_2$, a choke coil 26′ being used to isolate the alternating-current and direct-current circuits of the rectifier system as before.

It will be apparent that upon closure of the switches $S_1$ and $S_2$, the load impedance which is coupled across the output terminals $T_1$, $T_1$ of the rectifier network 16 is comprised by the conductance appearing across the output terminals $T_2$, $T_2$ of the rectifier network 17 as modified by the voltage of the battery B. Similarly, the load impedance which is coupled across the output terminals $T_2$, $T_2$ of the rectifier network 17 is comprised by the conductance appearing across the output terminals $T_1$, $T_1$ of the rectifier network 16 as modified by the voltage of the battery B.

The values of the resultant terminal voltages $e_1$ and $e_2$ of the rectifier networks with the switches $S_1$ and $S_2$ closed, can be obtained by a mathematical analysis hereinafter indicated. The significance of the solution is more readily shown graphically. The latter is accomplished, as shown in Fig. 3*b*, by inverting the graphical representation of the regulation characteristic of one rectifier network and superimposing it upon the graphical representation of the regulation characteristic of the other network, the axes of abscissae being spaced by the value of the voltage E of battery B. The justification for this spacing is apparent when it is considered that the sum of the voltages $e_1$ and $e_2$ must always equal the voltage E of the battery B. The graphical solution is premised upon the fact that the same unidirectional load current must flow through the two rectifier networks with their serially arranged output circuits. Thus, the values of the voltages $e_1$ and $e_2$ are graphically ascertained by the intersections of curves A and B since there is only one value of current I which develops two such voltages which when added are equal to the voltage E.

Assume now that the mutual conductance of each of the generators $G_1$ and $G_2$ remains constant but that the wave-signal voltages $E_{g-1}$ and $E_{g-2}$ are proportionately increased. This produces a proportionate change in the values of the currents $I_1$ and $I_2$, which now have values $I_1'$ and $I_2'$, with consequent change of the regulation characteristics of the rectifier networks to new values represented by broken-line curves A′ and B′ of Fig. 3*b*. For the regulation characteristics heretofore assumed, it is at once apparent that the voltage across the output terminals $T_1$, $T_1$ of the rectifier network 16 has now increased to a new value $e_1'$ while that across the output terminals of the rectifier network 17 has decreased to a value $e_2'$. The assumed regulation characteristics thus result in a change of the relative output voltages of the rectifier networks with change of amplitude of the applied wave-signal voltage. This condition is undesirable in a frequency detector since the latter is then responsive to undesired amplitude variations of a received wave signal.

This responsiveness of the detector system to amplitude variations of the received wave signal may be reduced or completely avoided by making the regulation characteristics of the rectifier networks 16 and 17 substantially identical at the mean frequency of the applied wave signal. Thus, curves A″ and B″ of Fig. 3*c* represent assumed but identical regulation characteristics for the rectifier networks. This may be accomplished by making the wave-signal voltages $E_{g-1}$ and $E_{g-2}$ equal to the same value $E_g$, by making the mutual conductance $g_{m-1}$ of the generator $G_1$ equal to the mutual conductance $g_{m-2}$ of the generator $G_2$, so that the short-circuit unidirectional current $I_{1/2}$ of one rectifier network is equal to the short-circuit unidirectional current $I_{2/2}$ of the other, and by making the two values of impedances $Z_1$ and $Z_2$ equal at the mean frequency of the applied wave signal. The wave-signal current $I_0$ flowing from the generator $G_1$ to the rectifier network 16 is thus equal to that flowing from the generator $G_2$ to the rectifier network 17. Under these conditions, if the wave-signal voltage $E_g$ be now assumed to increase by a given value, the wave-signal currents $I_0'$ flowing from the generators $G_1$ and $G_2$ to the respective rectifier networks 16 and 17 are increased by the same proportionate values so that the new regulation characteristics of the networks are now as represented by curves A‴ and B‴ of Fig. 3*c*. It is apparent that the rectifier-network terminal voltages $e_1''$ and $e_2''$ have the same values as before and thus have constant relative values with changes of applied wave-signal amplitude. The frequency detector consequently has substantially reduced or no response to undesired amplitude variations of the applied wave signal.

The criteria for the operating condition last described is thus seen to be that equal effective currents should be applied to each rectifier network; that is, that the energization of the networks should be the same as though they were effectively energized with equal wave-signal currents from identical though independent sources. This condition insures that equal short-circuit unidirectional currents $I_{0/2}$ are available at the output terminals of each rectifier network, preferably without regard to the frequency of the applied wave signal, and is effected in the present detector system by coupling the input circuits of the rectifier networks 16 and 17 in series across a common wave-signal source. The use of one or more current-regulated sources, which essentially are sources having output currents independent of the valve of load impedance coupled thereto, has the advantage that the wave-signal current applied to the detector system has a substantially constant value without regard to the individual loading of the rectifier networks 16, 17 so that the detector system is required to reject a reduced range of applied wave-signal intensities. With regard to the equal current flow to each rectifier network, it is desirable that short circuiting the output terminals of one network shall not affect the regulation characteristic of the other network.

The use in Fig. 3 of the battery B, having fixed terminal voltage E, introduces a limitation on the values of the output voltages $e_1$ and $e_2$ and on the extent to which a detector system of the type described remains nonresponsive to amplitude variations of the applied wave signal. It will be apparent that as the current of the generators $G_1$ and $G_2$ decreases, as with decrease of the wave-signal voltage $E_g$, the point of intersection of the curves A'' and B'' in Fig. 3c moves toward and eventually occurs on the axis of ordinates. The unidirectional current flowing in the common output circuits of the rectifier networks then is exactly zero and cannot become negative since the rectifier devices 20 and 21 do not conduct current in the opposite direction. Further decrease of the current of the generators $G_1$ and $G_2$ has no effect and the rectifier output circuits are effectively disconnected. The use of the battery consequently fixes a limitation on the minimum amplitude of the applied wave signal at which the detector system produces any output current.

The operational analysis heretofore considered has been premised upon the assumption that the generators $G_1$ and $G_2$ have the same constant wave-signal frequency. In further analyzing the operation, assume that the wave-signal currents of the generators $G_1$ and $G_2$ remain equal and constant but that the frequencies of the generators vary equally and in the same sense from that which provides the regulation characteristics represented by curves A'' and B'' of Fig. 3c. This change of generator frequency causes the value of impedance of the impedances $Z_1$ and $Z_2$ to change in opposite sense, one increasing while the other decreases, due to the fact that the tuned circuits 18, 19 are resonant at spaced frequencies symmetrical about the mean frequency of the applied wave signal. Since the rectifier networks 16 and 17 have the same short-circuit unidirectional currents $I_{0/2}$ without regard to the applied wave-signal frequency but have different open-circuit voltages $I_0Z_1$ and $I_0Z_2$, it is apparent that the regulation characteristics of these networks must change slope with frequency as represented by curves $A^{IV}$ and $B^{IV}$ of Fig. 3d. The regulation characteristics represented by curves A'' and B'' in Fig. 3c are repeated in Fig. 3d for comparison. The assumed change of wave-signal frequency thus increases the voltage $e_1''$ of one network to a value $e_1'''$ whereas it effects a decrease of the voltage $e_2''$ of the other network to a value $e_2'''$. If the frequency remains unchanged at the new value but the amplitude of the applied wave signal changes, it will be apparent from the discussion of the curves of Fig. 3c that the output voltages $e_1'''$ and $e_2'''$ do not change relative magnitudes. The frequency detector is thus seen to be nonresponsive to amplitude variations of the applied wave signal without regard to the frequency of the latter.

A mathematical analysis of the detector operation becomes relatively simple if the same assumptions are made as were made in the foregoing graphical analysis of the operation. Referring to the regulation characteristics graphically shown by Fig. 3b, it will be apparent that the output voltage $e_1$ of the rectifier network 16 has the value:

$$e_1=I_1Z_1-2IZ_1=Z_1(I_1-2I) \qquad (1)$$

where I=the value of unidirectional current producing the output voltage.

Likewise, the output voltage $e_2$ of the rectifier network 17 has the value:

$$e_2=Z_2(I_2-2I) \qquad (2)$$

The output potential $e_1$, obtained by simultaneous solution of Equations 1 and 2, is given by the relation $$e_1=Z_1\left(I_1-I_2+\frac{e_2}{Z_2}\right) \qquad (3)$$

Since the unidirectional output circuits of the rectifier networks 16 and 17 are connected in series, the output voltage $e_2$ of the network 17 has the value:

$$e_2=E-e_1 \qquad (4)$$

Substituting this value of $e_2$ into Equation 3 and simplifying, the output voltage $e_1$ of the rectifier network 16 has the value:

$$e_1=\frac{Z_1(I_1-I_2)}{1+\frac{Z_1}{Z_2}}+E\frac{Z_1/Z_2}{1+Z_1/Z_2} \qquad (5)$$

It will be apparent from Equation 5 that if the wave-signal current $I_1$ in the rectifier network 16 has the same value as the wave-signal current $I_2$ in the network 17, Equation 5 simplifies to the form:

$$e_1=E\frac{Z_1/Z_2}{1+Z_1/Z_2} \qquad (6)$$

Thus by making the wave-signal currents $I_1$ and $I_2$ equal, it is at once evident from Equation 6 that the output potential of either rectifier network is dependent only upon the ratio of the impedances $Z_1$ and $Z_2$ and is independent of the intensity of the applied wave signal. The ratio of the impedances $Z_1$ and $Z_2$ varies, of course, with the frequency deviation of the applied wave signal so that the output of either rectifier network varies only with the frequency deviation of a frequency-modulated wave signal applied thereto and is unaffected by any intensity variation of the applied wave signal.

In the foregoing description of the detector operation, two changes were made in establishing the equivalent circuit diagram of Fig. 3 from the actual circuit arrangement of the Fig. 1 frequency detector. One was that the rectifier networks were energized by separate generators $G_1$ and $G_2$. In Fig. 1, on the other hand, the two rectifier networks 16 and 17 are energized from the same wave-signal source comprising the repeater 27. The assumption of independent generators in the Fig. 3 equivalent circuit is simply one of convenience but is not essentially different from the actual detector arrangement of Fig. 1. The output current of vacuum tube 27 flows through the serially connected input circuits of the rectifier networks 16 and 17 so that the current in each must be the same. It is of advantage to use a pentode type of vacuum tube 27, thus to provide a current-regulated source, since the output current of this tube then is independent of the impedance of either of the rectifier networks 16 and 17 but a tube of this type is not essential. In this regard, it may be noted that the inherent capacitance 30 of the output circuit of tube 27 tends to couple the tuned circuits 18, 19 of the rectifier networks and, unless compensated, would cause a change of current of one network to affect the regulation of the other network. The variable inductor 31 compensates the effect of the capacitance 30, and this may be done by adjusting the value of the inductor 31 to resonate with the capacitance 30 at the mean frequency of the applied wave signal. The capacitance 30 and inductor 31 then constitute a parallel-resonant circuit which has high impedance to the flow of wave-signal current, from the output circuit of tube 27, therethrough to ground. The use of the inductor 31 has the additional advantage that it effects an increased amplification as earlier mentioned.

The second manner in which the equivalent circuit of Fig. 3 differs from the actual detector arrangement of Fig. 1 lies in the use of the battery B in the equivalent circuit in place of the load impedances 24, 25 of the actual detector system. The time constant of the load impedance 24, 25 is so long that it effectively acts like a battery of constant terminal potential over any period corresponding to the lowest-frequency undesired amplitude-modulation component. The only difference between the use of a load impedance as in Fig. 1 and a battery as in Fig. 3 is that the value of the relatively constant potential developed across the terminals of the load impedance varies with slow changes of the received wave-signal intensity. Thus while a battery of fixed potential can be used in place of the load impedance 24, 25, it is usually preferable to use the load impedance since the choice of a battery potential E sufficiently small for correct operation at low wave-signal intensities would prevent a substantial increase in detector sensitivity at high wave-signal intensities. Conversely, if the battery voltage E were chosen sufficiently large to provide optimum sensitivity at high wave-signal intensities, the detector would cease to provide an undistorted output should the amplitude of the wave signal decrease to the value at which the product of the input current $I_0$ and the sum of the impedances $Z_1$ and $Z_2$ is equal to the battery voltage E. At the latter value, as previously pointed out, the unidirectional current in the output circuits of the rectifiers becomes zero. By using a load impedance 24, 25 as in Fig. 1, the bias potential developed across the load impedance varies with wave-signal intensity so that the detector system has high sensitivity for large wave-signal intensities, yet is substantially nonresponsive to undesired rapid amplitude variations over a wide range of wave-signal intensities.

The sensitivity characteristic and the amplitude nonresponsiveness characteristic of the detector system are controlled in large part by suitable choice of the value of the load resistor 24. The value of this resistor is related to the input-circuit impedances of the rectifier networks 16 and 17 since this determines the magnitude of the bias potential developed across the load impedances 24, 25 in relation to the sum of the wave-signal potentials developed across the resonant circuits 18 and 19. The value of the resistor 24 is not critical in nature, however, and may be easily selected to ensure optimum sensitivity of the detector system over a wide range of received wave-signal intensities while maintaining distortionless output of the system over a substantial range of amplitude variations of a wave signal of given intensity. For reasons presently to be pointed out, the optimum impedance of the resonant circuits 18 and 19 is related to the internal resistances of the rectifiers 20 and 21 and thus is determined largely by the characteristics of the rectifier selected.

In the foregoing analysis of the detector system operation, it was assumed that the rectifiers 20 and 21 had 100% efficiency, that the rectifier networks 16 and 17 were completely uncoupled for currents of wave-signal frequencies, and that the input-circuit impedances $Z_1$ and $Z_2$ of the rectifier networks had purely resistive impedances which varied in relative magnitudes but remained resistive with the frequency deviation of an applied wave signal. A rigorous analysis of the operation taking these assumptions into account is rather complex since the voltage-current characteristics of the rectifier tubes are non-linear and since the input impedances $Z_1$ and $Z_2$ may have reactive components which vary in magnitude with the frequency deviation of an applied frequency-modulated wave signal. If the rectifiers be assumed to have 100% efficiency, the reactive components of the input-circuit impedances $Z_1$ and $Z_2$ have the effect of causing the regulation characteristics of each rectifier network to be non-linear. Referring to Fig. 2*a*, a reactive component appearing in the impedance $Z_1$ has the effect of causing the regulation characteristics there shown to have the same values at the extremities $I_1Z_1$ and $I_1/2$ but to have larger values than shown at intermediate points, thus producing a characteristic which is slightly curved upwardly. On the other hand, if it be assumed that the input impedances $Z_1$ and $Z_2$ do not have such reactive components but that the rectifier devices have less than 100% efficiency, then the regulation characteristic is again non-linear but in this case curves downwardly between its extremities. A non-linearity of the regulation characteristic caused by reactive components of impedance is not affected by the intensity of the applied wave signal. A non-linearity caused by rectifier inefficiency, however, changes with such intensity. While it has been found in practice that the non-linearity of the regulation characteristic caused by reactive components of impedance can, if desired, be effectively compensated by the reverse non-linearity caused by rectifier inefficiency, optimum amplitude-modulation rejection is not necessarily attained by compensation which produces linearity. Either optimum linearity or amplitude-modulation rejection may be accomplished by suitably choosing the values of the input-circuit impedances $Z_1$ and $Z_2$ with relation to the equivalent internal resistances of the rectifiers 20 and 21. Amplitude variations appearing in the output circuit of the detector system in phase with amplitude variations of the applied wave signal may be indicative of a rectifier efficiency too low in comparison with the input-circuit impedances $Z_1$ and $Z_2$. On the other hand, amplitude variations appearing in the output circuit of the detector in opposite phase to amplitude variation of the applied wave signal may be indicative of a rectifier efficiency too high as compared to the input-circuit impedances. For most applications, however, a satisfactory ratio of input-circuit impedance to rectifier resistance can be realized over a substantial range of applied wave-signal intensities. It will thus be apparent that some amplitude variations may appear in the output circuit of the detector system when the intensity of the applied wave signal is either very high or very low. Over an intermediate range of applied wave-signal intensities, however, the detector system is substantially unresponsive even to substantial variations of wave-signal amplitude.

By utilizing the unidirectional potential developed across the detector system load impedance 24, 25 for purposes of automatic volume control, in a manner presently to be described, a relatively wide range of received wave-signal intensities is reduced to a much smaller range of intensities at the input circuit of the detector system such that the latter has substantially no response even to substantial variations of amplitude of a received wave signal.

A third assumption made both in the graphical and mathematical analyses of the detector operation was that the rectifier networks 16 and 17 were completely uncoupled for currents of wave-signal frequencies. Two entirely separate wave-signal sources were utilized in Fig. 3 for this purpose and it was stated in the description of the Fig. 1 arrangement that the inductor 31 was used as an aid in this regard. This assumption was made to simplify the analysis in that a change of loading of one rectifier network then has no effect on the regulation characteristic of the other. There is a substantial advantage in practice, however, in maintaining the rectifier networks thus uncoupled since it is then easier to adjust them for optimum operating conditions. That is, there is then greater freedom in the selection of their input-circuit impedances, as by varying the tuning of the resonant circuits 18 or 19 or otherwise to change the magnitude of its reactive component of impedance, or even to make the input circuit impedances unequal if necessary while ensuring that the wave-signal current flowing in one rectifier network is equal to that in the other. The use of the inductor 31 for this decoupling function has the additional advantage, as earlier mentioned, that it increases the amplification of the repeater vacuum tube 27 over the value which it otherwise would have in the absence of the inductor.

As pointed out above in connection with the curves of Fig. 3b, the output potentials of the rectifier networks have values varying with the instantaneous frequency of the applied wave signal. It is thus apparent that each rectifier network develops across its output terminals, the frequency-modulation components of the applied wave signal and, hence, either rectifier-network output circuit may be utilized as the output circuit of the detector. The output circuit of the rectifier 17 is utilized in the Fig. 1 arrangement as the output circuit of the detector and is coupled through the radio-frequency choke coil 34 and the coupling condenser 35 to the input circuit of the audio-frequency amplifier 14.

As earlier mentioned, the relatively constant potential developed across the detector load impedance 24, 25 varies with the average value of received wave-signal intensity. This potential has negative polarity with respect to ground. It is therefore suitable for use as an automatic volume-control bias by which automatically to control the gains of the units 10 and 12, and unit 13 if desired, to maintain the intensity of the intermediate-frequency wave signal applied to the frequency detector of unit 13 substantially constant for a wide range of received wave-signal intensities.

It may be noted that the modulation components derived across the rectifier 21, and applied to the output circuit of the detector, also appear across the coupling condenser 23. This condenser is sufficiently large to have low impedance for currents of wave-signal frequencies but is sufficiently small to have high impedance for currents of modulation-signal frequencies. Since the condenser 23 maintains the low-potential terminal of the resonant circuit 19 at ground potential for the frequencies involved, the detector system in Fig. 1 may be somewhat simplified by coupling the output circuit of the detector across the condenser 23, rather than across the diode 21, thereby dispensing with the need of the radio-frequency choke coil 34.

It is desirable in frequency detectors that the detector have a linear input-output characteristic. By a linear characteristic is meant one in which the unidirectional output voltage of one of the rectifier networks 16 or 17 has an amplitude varying linearly with the frequency deviation of the applied wave signal from its mean value. Such linearity in the detector of the present invention is related to the frequency separation between the resonant frequencies of the resonant circuits 18 and 19 and to the Q's, or ratio of inductive reactance to resistance, of these circuits. There is an optimum frequency spacing for each value of tuned circuit Q. This optimum spacing may be readily ascertained in a practical application of the invention simply by varying the frequency spacing until a satisfactory linearity of the detector characteristic is obtained.

Fig. 4 is a circuit diagram representing a frequency-modulation detector system embodying a modified form of the invention which is essentially similar to the detector system of Fig. 1, similar circuit elements being designated by similar reference numerals and analogous elements by similar reference numerals primed. In the instant detector system, the load impedance 24, 25 is serially included with the diode rectifiers 20, 21 in a series unidirectional current conductive circuit which includes the resonant circuits 18, 19. A condenser 38 is included in common to both of the rectifier networks 16', 17' to complete for each a wave-signal conductive circuit which is independent of the wave-signal conductive circuit of the other rectifier network. The condenser 25 necessarily has a large value of capacitance to provide the required time constant of the load impedance 24, 25 and thus is likely to have substantial inductive reactance at wave-signal frequencies. Since this condenser is serially included in the wave-signal conductive circuit of the rectifier network 17', it is desirable that any detrimentally large inductive reactance of the condenser be rendered ineffective by the use of a shunt-connected filter condenser 39 having low impedance for currents of wave-signal frequencies. The operation of this modified form of the invention is essentially similar to that of the Fig. 1 detector system and will not be repeated.

Fig. 5 is a circuit diagram representing an additionally modified form of the invention essentially similar to that of Fig. 4, similar elements being designated by similar reference numerals, except that the instant detector system includes an output circuit effectively coupled to the wave-signal source to apply to the output circuit wave signals substantially equal in amplitude but opposite in phase compared to the wave signals applied to it by the rectifier 21. This is accomplished by serially including in the output circuit an inductor 41 which is of the same inductance as the inductor of the resonant circuit 19 and is closely coupled thereto. The purpose of this output-circuit arrangement is to dispense with the need of the separately mounted radio-frequency choke coil 34 used in Fig. 4 to isolate the output circuit of the detector from currents of wave-signal frequencies flowing in the rectifier networks 16' and 17'. Thus, while the derived modulation-signal components appear across the diode rectifier 21, and are applied to the output circuit of the Fig. 5 detector system, the voltages at wave-signal frequencies which appear across this rectifier, are not applied to the output circuit since they are opposed by similar voltages of equal amplitude but opposite phase applied to the output circuit through the inductor 41 from the resonant circuit 19. The operation of this modified form of the invention is otherwise essentially similar to that of Fig. 4.

Fig. 6 is a circuit diagram representing yet another modified form of the invention essentially similar to that of Fig. 4, similar elements being designated by similar reference numerals and analogous elements by similar reference numerals double primed. The instant detector system is a balanced one in which wave signals are applied through individual translating channels to the rectifier networks 16′ and 17′. The wave-signal input currents in each of the translating channels and rectifier networks are always equal in amplitude to those of the other. This is accomplished by the provision of a second vacuum tube repeater 27″ having the same transconductance as repeater 27 and having input electrodes coupled to the intermediate-frequency band-pass selector 28 either in push-pull relation or in parallel relation to the coupling of the input electrodes of vacuum tube 27 to this selector. The output circuit of vacuum tube 27 includes an inductor 45 coupled to the resonant circuit 18 while the output circuit of vacuum tube 27″ includes a similar inductor 46 coupled to the resonant circuit 19, whereby the wave signals translated by the vacuum tube 27 are applied only to the rectifier network 16′ while wave signals translated by the vacuum tube 27″ are applied only to the rectifier network 17′. The series unidirectional current conductive circuit of the detector is balanced with respect to ground, the condenser 25 of Fig. 4 being divided in the present detector system into two equal series-connected condensers 25″, 25″ each of capacitance equal to twice that of the condenser 25 and the resistor 24 being divided into two equal serially connected resistors 24″ and 24″ each of resistance equal to half that of the resistor 24 to maintain the same time constant for the detector load impedance. The by-pass condenser 39 used in the Fig. 4 arrangement is also divided in the present detector system into two equal series-connected condensers 39″ and 39″. The junctions of the condensers 25″, 25″ and 39″ and 39″ and the resistors 24″ and 24″ are connected to ground. The common coupling condenser 38 of the Fig. 4 detector is likewise divided into two equal condensers 38″, 38″ which are included in individual ones of the rectifier networks 16′, 17′. The operation of this modified form of the invention is essentially similar to that of Fig. 4 except that the modulation-signal output potentials of the detector are balanced to ground and coupling between the wave-signal circuits of the rectifier networks is largely avoided, thus even further improving the unresponsiveness of the detector system to undesired transient amplitude variations of a received wave signal. The present detector arrangement may be utilized, if desired, for conventional automatic frequency control, such as a frequency control of the oscillator of the unit 10 in the Fig. 1 arrangement. This is accomplished by applying the unidirectional output potential of the detector system through a filter circuit comprising a series resistor 47 and a shunt condenser 48 to a conventional frequency control system of well-known type. The utility of such automatic frequency control arrangements is now so well known as to merit no discussion here.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially non-conductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit effectively coupled across a portion of said series circuit including one of said rectifiers.

2. A frequency-modulation detector system comprising, a pair of resonant circuits in series with one another, a pair of rectifiers in series with one another and having individual ones thereof coupled across individual ones of said resonant circuits to form a pair of rectifier networks, said networks having individual amplitude-translation characteristics varying in opposite sense with frequency over a predetermined frequency range, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit effectively coupled across a portion of said series circuit including one of said rectifiers.

3. A frequency-modulation detector system comprising, a pair of uncoupled resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit effectively coupled across a portion of said series circuit including one of said rectifiers.

4. A frequency-modulation detector system comprising, a pair of effectively two-terminal uncoupled resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit effectively coupled across a portion of said series circuit including one of said rectifiers.

5. A frequency-modulation detector system comprising, a pair of uncoupled resonant circuits tuned to individual spaced frequencies in a predetermined frequency range to have individual amplitude-translation characteristics varying in opposite sense with frequency over said range, a pair of rectifiers in series with one another and having individual ones thereof coupled across individual ones of said resonant circuits to form a pair of rectifier networks, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit effectively coupled across a portion of said series circuit including one of said rectifiers.

6. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means including a current regulated source for applying a frequency-modulated wave signal to both of said networks while maintaining equal effective values of wave-signal current flow to each thereof, and a modulation-signal output circuit effectively coupled across a portion of said series circuit including one of said rectifiers.

7. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, a load impedance having a time constant substantially longer than the period of the lowest frequency undesired amplitude-modulation component and included with the rectifiers of said networks in a series unidirectional current conductive circuit in which said rectifiers have like polarity, means for applying a frequency-modulated wave signal to both of said networks while maintaining equal effective values of wave-signal current flow to each thereof, and a modulation-signal output circuit effectively coupled across a portion of said series circuit including one of said rectifiers.

8. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, a load impedance having a time constant substantially longer than the period of the lowest frequency undesired amplitude-modulation component and coupled in shunt with the rectifiers of said networks to provide with said rectifiers a series unidirectional current conductive circuit in which said rectifiers have like polarity, means for applying a frequency-modulated wave signal to both of said networks while maintaining equal effective values of wave-signal current flow to each thereof, and a modulation-signal output circuit effectively coupled across a portion of said series circuit including one of said rectifiers.

9. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, a load impedance having a time constant substantially longer than the period of the lowest frequency undesired amplitude-modulation component and serially included with the rectifiers of said networks in a series unidirectional current conductive circuit in which said rectifiers have like polarity, means for applying a frequency-modulated wave signal to both of said networks while maintaining equal effective values of wave-signal current flow to each thereof, and a modulation-signal output circuit effectively coupled across a portion of said series circuit including one of said rectifiers.

10. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, a load impedance having a time constant of the order of one-fourth second and included with the rectifiers of said networks in a series unidirectional current conductive circuit in which said rectifiers have like polarity, means for applying a frequency-modulated wave signal to both of said networks while maintaining equal effective values of wave-signal current flow to each thereof, and a modulation-signal output circuit effectively coupled across a portion of said series circuit including one of said rectifiers.

11. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, a load impedance including a resistor and parallel-connected condensers having a time constant substantially longer than the period of the lowest frequency undesired amplitude-modulation component and included with the rectifiers of said networks in a series unidirectional current conductive circuit in which said rectifiers have like polarity, means for applying a frequency-modulated wave signal to both of said networks while maintaining equal effective values of wave-signal current flow to each thereof, the value of said resistor being proportioned with relation to the input-circuit impedances of said networks to minimize undesired amplitude variations of said applied wave signal over a substantial range of intensities of said applied wave signal, and a modulation-signal output circuit effectively coupled across a portion of said series circuit including one of said rectifiers.

12. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substanitally nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means including a vacuum-tube repeater for applying a frequency-modulated wave signal to both of said networks while maintaining equal effective values of wave-signal current flow to each thereof, the output circuit of said repeater having inherent capacitance tending undesirably to couple said rectifier networks, means for reducing the effect on said networks of said inherent capacitance to reduce the coupling of said networks thereby, and a modulation-signal output circuit effectively coupled across a portion of said series circuit including one of said rectifiers.

13. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means including a vacuum-tube repeater for applying a frequency-modulated wave signal to both of said networks while maintaining equal effective values of wave-signal current flow to each thereof, the output circuit of said repeater having inherent capacitance tending undesirably to couple said rectifier networks, an inductor tuned by said capacitance to resonance at a frequency in said range to reduce the coupling of said networks by said capacitance, and a modulation-signal output circuit effectively coupled across a portion of said series circuit including one of said rectifiers.

14. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude - translation characteristic varying with frequency over a predetermined frequency range, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit coupled across one of said rectifiers and effectively coupled to said last-mentioned means to have applied to said output circuit wave signals of substantially equal amplitude but opposite phase to the wave signals applied to said one rectifier.

15. A frequency-modulation detector system comprising, a pair of uncoupled resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit coupled across the rectifier of one of said networks and including an inductor coupled to the resonant circuit of said one network to have applied to said output circuit wave signals of equal amplitude but opposite phase to the wave signals applied to said last-mentioned rectifier.

16. A frequency-modulation detector system comprising, a pair of resonant circuits in series with one another, a pair of rectifiers in series with one another and having individual ones thereof coupled across individual ones of said resonant circuits to form a pair of rectifier networks, at least one of said networks having an amplitude - translation characteristic varying with frequency over a predetermined frequency range, said networks being individually conductive for wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired modulation component, means for applying a frequency-modulated wave signal to both of said networks in an effective series circuit arrangement thereof to maintain equal effective values of wave-signal current flow to each thereof, and a modulation-signal output circuit effectively coupled across a portion of said series circuit including one of said rectifiers.

17. A frequency-modulation detector system comprising, a pair of resonant circuits in series with one another and having substantially no coupling with one another for currents of wave-signal frequencies within a predetermined frequency range, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for said wave-signal currents but individually substantially nonconductive for currents of modulation-signal frequencies, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude - modulation component, means for applying a frequency-modulated wave signal to both of said networks while maintaining equal effective values of wave-signal current flow to each thereof, and a modulation-signal output circuit effectively coupled across a portion of said series circuit including one of said rectifiers.

18. A frequency-modulation detector system comprising, a pair of uncoupled resonant circuits in series with one another, a pair of rectifiers in series with one another and having individual ones thereof coupled across individual ones of said resonant circuits to form a pair of rectifier networks, at least one of said networks having an amplitude-translation characteristic varying with frequency over a predetermined frequency range, said networks being individually conductive for wave-signal currents but individually substantially nonconductive for currents of modulation-signal frequencies, said one resonant circuit having over said frequency range a reactive component of impedance tending to produce a nonlinear regulation characteristic for the one of said networks associated therewith and the one of said rectifiers associated with said one network having a rectification efficiency sufficiently less than 100% as to provide for said one network a substantially complementary nonlinear regulation characteristic over a substantial range of intensities of a wave signal to be applied thereto, whereby said one network has an overall substantially linear regulation characteristic over said range of wave-signal intensities, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both the said networks while maintaining equal effective values of wave-signal current flow to each thereof, and a modulation-signal output circuit effectively coupled across a portion of said series circuit including one of said rectifiers.

19. A frequency-modulation detector system comprising, a pair of uncoupled resonant circuits tuned to individual spaced frequencies in a predetermined frequency range to have individual amplitude-translation characteristics varying in opposite sense with frequency over said range, a pair of rectifiers in series with one another and having individual ones thereof coupled across individual ones of said resonant circuits to form a pair of rectifier networks, said networks being individually conductive for wave-signal currents but individually substantially nonconductive for currents of modulation-signal frequencies, said resonant circuits having over said frequency range reactive components of impedance tending to produce a nonlinear regulation characteristic for the one of said networks associated therewith but said rectifiers having rectification efficiencies sufficiently less than 100% as to provide for each of said networks a substantially complementary nonlinear regulation characteristic over a substantial range of intensities of a wave signal to be applied thereto, whereby said networks have substantially linear overall regulation characteristics over said range of wave-signal intensities, means included with the rectifiers of said networks in a series unidirectional current conductive circuit in which said rectifiers have like polarity and adapted to provide in said last-mentioned circuit a bias potential which may change with wave-signal intensity but which has a substantially constant value over any period corresponding to a cycle of the lowest frequency undesired amplitude-modulation component, means for applying a frequency-modulated wave signal to both of said networks while maintaining equal effective values of wave-signal current flow to each thereof, and a modulation-signal output circuit effectively coupled across a portion of said series circuit including one of said rectifiers.

LESLIE F. CURTIS.
BERNARD D. LOUGHLIN.

REFERENCES CITED

The following references are of record in the file of this patent:

UNITED STATES PATENTS

| Number | Name | Date |
|---|---|---|
| 2,363,650 | Crosby | Nov. 28, 1944 |
| 2,376,126 | Crosby | May 15, 1945 |
| 2,379,688 | Crosby | June 3, 1945 |
| 2,413,913 | Duke | Jan. 7, 1947 |
| 2,413,977 | Koch | Jan. 7, 1947 |
| 2,445,621 | Lange | July 20, 1948 |

OTHER REFERENCES

Radio, Oct. 1945, Ratio Detectors for F. M. Receivers, pages 18, 19 and 20. (Copy in Division 10.)